United States Patent [19]
Peacock

[11] Patent Number: 5,937,786
[45] Date of Patent: Aug. 17, 1999

[54] MILKING MACHINE RETRACTOR

[75] Inventor: Steve Peacock, Portales, N.Mex.

[73] Assignee: Peacock Bros. Inc., Portales, Mexico

[21] Appl. No.: 09/060,041

[22] Filed: Apr. 14, 1998

Related U.S. Application Data

[60] Provisional application No. 60/043,277, Apr. 17, 1997.

[51] Int. Cl.⁶ .................................................. A01J 5/017
[52] U.S. Cl. ......................................................... 119/14.11
[58] Field of Search .............................. 119/14.01, 14.1,
119/14.03, 14.13, 14.11, 14.18, 670, 14.04

[56] References Cited

U.S. PATENT DOCUMENTS

| | | | |
|---|---|---|---|
| 833,890 | 10/1906 | Padfield | 119/14.1 |
| 1,425,585 | 8/1922 | Gessler | 119/14.45 |
| 2,469,519 | 5/1949 | Redin et al. | 119/14.03 |
| 3,223,070 | 12/1965 | Gribble et al. | 119/14.03 |
| 3,246,631 | 4/1966 | Holm | 119/14.03 |
| 3,301,215 | 1/1967 | Shakarian | 119/14.02 |
| 3,566,841 | 3/1971 | Gerrish | 119/14.15 |
| 3,593,687 | 7/1971 | Clegg | 119/14.1 |
| 3,605,695 | 9/1971 | Thomas et al. | 119/14.1 |
| 3,738,321 | 6/1973 | Hicks | 119/14.45 |
| 3,810,442 | 5/1974 | Jacobs et al. | 119/14.03 |
| 3,818,866 | 6/1974 | Thomas | 119/14.1 |
| 3,999,516 | 12/1976 | Shulick | 119/14.1 |
| 4,010,714 | 3/1977 | Notsuki et al. | 119/14.03 |
| 5,042,428 | 8/1991 | Van Der Lely et al. | 119/14.08 |
| 5,713,301 | 2/1998 | Van Der Lely | 119/14.02 |
| 5,778,820 | 7/1998 | Van Der Lely et al. | 119/14.18 |
| 5,862,776 | 1/1999 | Van Den Berg | 119/14.1 |

Primary Examiner—Michael J. Carone
Assistant Examiner—James S. Bergin
Attorney, Agent, or Firm—Shoemaker and Mattare, Ltd.

[57] ABSTRACT

A milking machine retractor includes a pair of rails affixed to a stall, the rails defining a path along which a carriage rides. The carriage has an arm extending away from the path, and a rod mounted on the arm is tethered to the milkers so that as the carriage moves away from the udder, the milkers are removed from the teats.

The rails twist about the path so that the arm swings from a substantially vertical orientation at the lower end of the path to a substantially horizontal orientation at the upper end of the path. As a result of the resultant twisting carriage motion, the milkers are initially pulled down, off the teats, and then are withdrawn from the stall without touching the floor.

6 Claims, 5 Drawing Sheets

MILKING MACHINE RETRACTOR

This application claims priority from United States provisional patent application 60/043,277 filed Apr. 17, 1997.

BACKGROUND OF THE INVENTION

This invention relates to the dairy art and more particularly to a milking machine retractor.

Some modern dairies milk thousands of cows per day in buildings known as parlors. To handle such volume, it is advantageous to automate the process, so much of the tedious work once done by hand is now done by machines.

The milkers themselves (connected to each other in a group of four called a "claw") are still applied to the teats by hand, but they may be removed mechanically. Current devices for removing milkers from the cow are essentially flaccid tethers, which pull the milkers off the teats horizontally, hardly the optimum direction, and which may allow the milkers to strike the floor, where they may be contaminated with manure. Once that happens, of course, the milkers must be thoroughly cleaned before the next cow is milked. It would be better to have an automatic milker remover which would pull the milkers off downward, yet would prevent them from touching the parlor floor.

SUMMARY OF THE INVENTION

An object of the invention is to improve the automatic removal of milkers from cows at the end of the milking period.

Another object of the invention is to prevent the milkers from becoming contaminated as they are removed from the cows.

These and other objects are attained by a milking machine retractor which includes a pair of rails affixed to the stall, a carriage that runs on the rails, and an arm on the carriage to which the milkers are tethered.

The rails define a path having a lower end nearer the udder and an upper end further from the udder. As the carriage moves along a path upward and away from the udder, it pulls the milkers from the teats.

The rails twist about the path so that the arm swings from a substantially vertical orientation at the lower end of the path to a substantially horizontal orientation at the upper end of the path. This geometry causes the milkers to be initially pulled down, off the teats, and then to be withdrawn sideways without touching the floor.

BRIEF DESCRIPTION OF THE DRAWINGS

In the accompanying drawings.

DESCRIPTION OF THE PREFERRED EMBODIMENT

Figure 1:
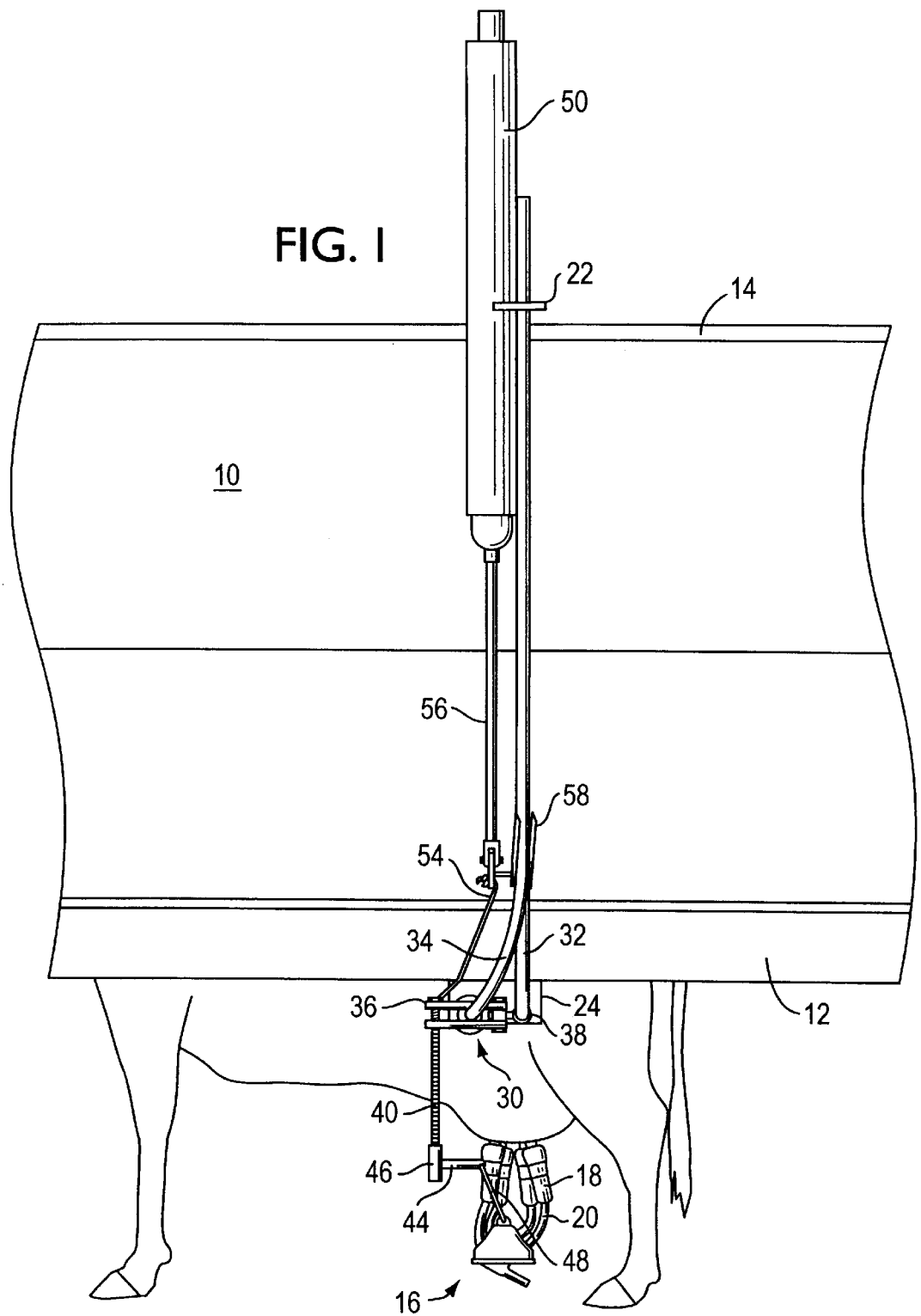
FIG. 1 is a side elevation of a milking parlor stall, showing a cow being milked automatically.
Figure 2:
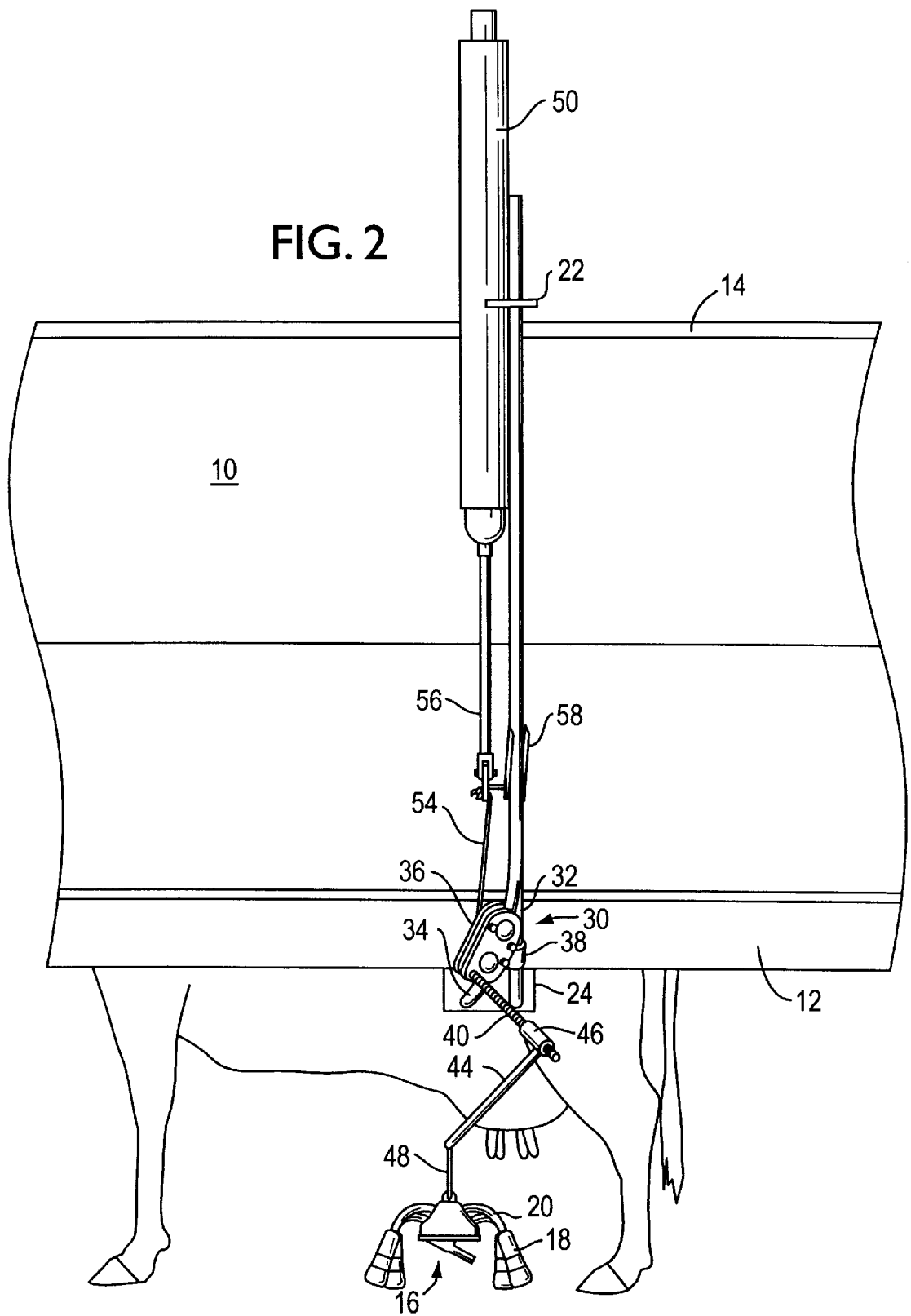
FIG. 2 is a similar view showing the milkers being removed.
Figure 3:
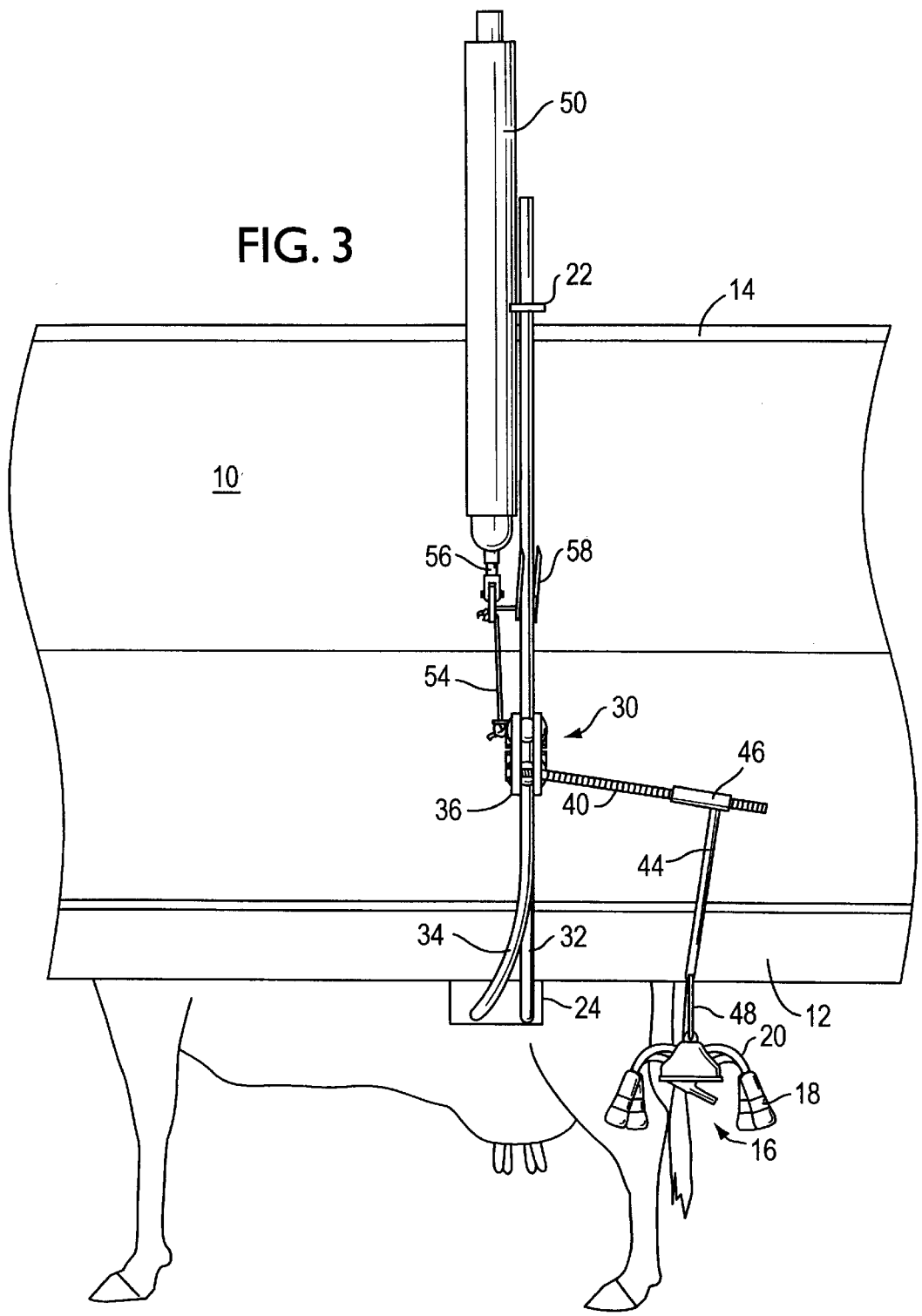
FIG. 3 is a similar view showing the milkers fully retracted.
Figure 4:
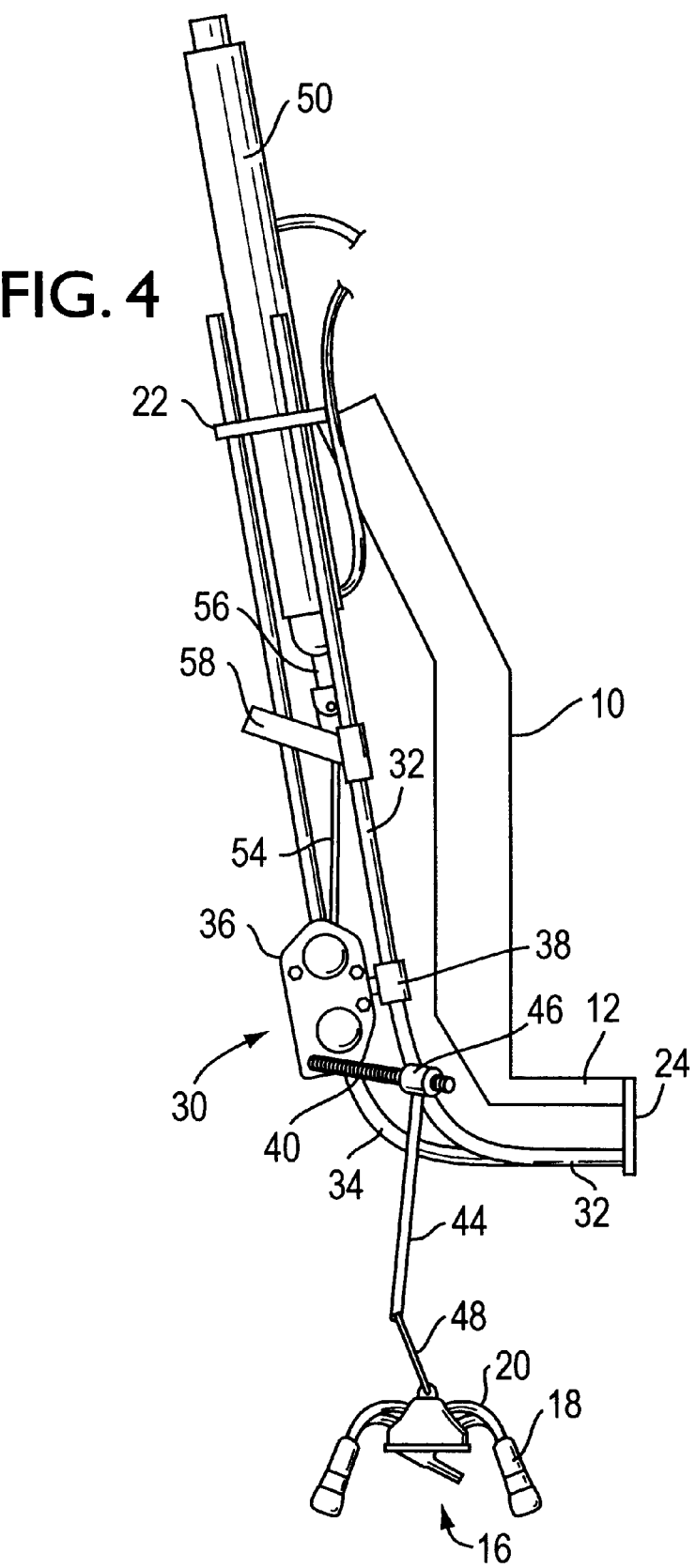
FIG. 4 is a corresponding view looking from the front of the stall, showing in addition an automatic retractor embodying the invention.

A milking machine retractor embodying the invention is shown in FIG. 1 in association with a stall bounded by a pair of side walls 10, one of which is visible from the outside of the stall. The wall has a flanged lower edge 12 and a flanged top edge 14.

A milking claw 16, comprising four interconnected milkers 18 having milk conduits 20, appears in FIG. 1 beneath the udder of a cow in the stall. The claw is supported by a retractor assembly including a carriage 30 riding on a pair of fixed rails 32, 34. The rails are supported at the top by a bracket 22 affixed to the top flange of the stall wall, and at the bottom, they are butt welded to a plate 24 affixed to the bottom flange of the wall.

The rails 32 and 34, preferably formed from round steel stock, bend beneath the bottom edge of the wall, so the bottom portion of the path they define is curved. The rails have a constant separation, but are straight only at their upper ends, where they lie in a common vertical plane which is transverse to the length of the stall; at the bottom, the rails are entwined or twisted, terminating in a common horizontal plane perpendicular to the plate 24. As a result, the carriage yaws (i.e., twists about its direction of movement) about 90° as it approaches the plate.

The center line of the inner rail 32 lies entirely in a plane "P" which is transverse to the length of the stall. The upper portion of the outer rail 34 lies in the same plane, but its lower portion deviates out of (forward from) that plane. Taking the bottom end of the inner rail 32 as the origin (0,0,0) of an orthogonal coordinate system in which Z is the forward horizontal (longitudinal) direction, X is the horizontal transverse direction outwardly from the center of the stall, and Y is the vertical direction, the coordinates (in inches) of selected spots along each of the rails are recorded in the tables below.

TABLE 1

| X | Y | Z |
|---|---|---|
| Inner rail 32 | | |
| 0 | 0 | 0 |
| 5 | 0 | 0 |
| 10 | 5 | 0 |
| 14 | 34 | 0 |
| Outer rail 34 | | |
| 0 | 0 | 2.75 |
| 2.75 | 0 | 2.75 |
| 7.75 | 0 | 2.75 |
| 12.75 | 5 | 0 |
| 16.75 | 34 | 0 |

The inner rail 32 has a linear segment from (0,0,0) to (5,0,0), then a curved segment from (5,0,0) to (10,5,0), and then a linear segment from (10,5,0) to (14,34,0).

The outer rail 34 has a linear segment from (0,0,2.75) to (7.75,0,2.75), a curved segment from (7.75,0,2.75) to (12.75,5,0), and a straight segment from (12.75,5,0) to (16.75,34,0).

The spacing between the rails is a constant 2.75 inches.

Figure 5:
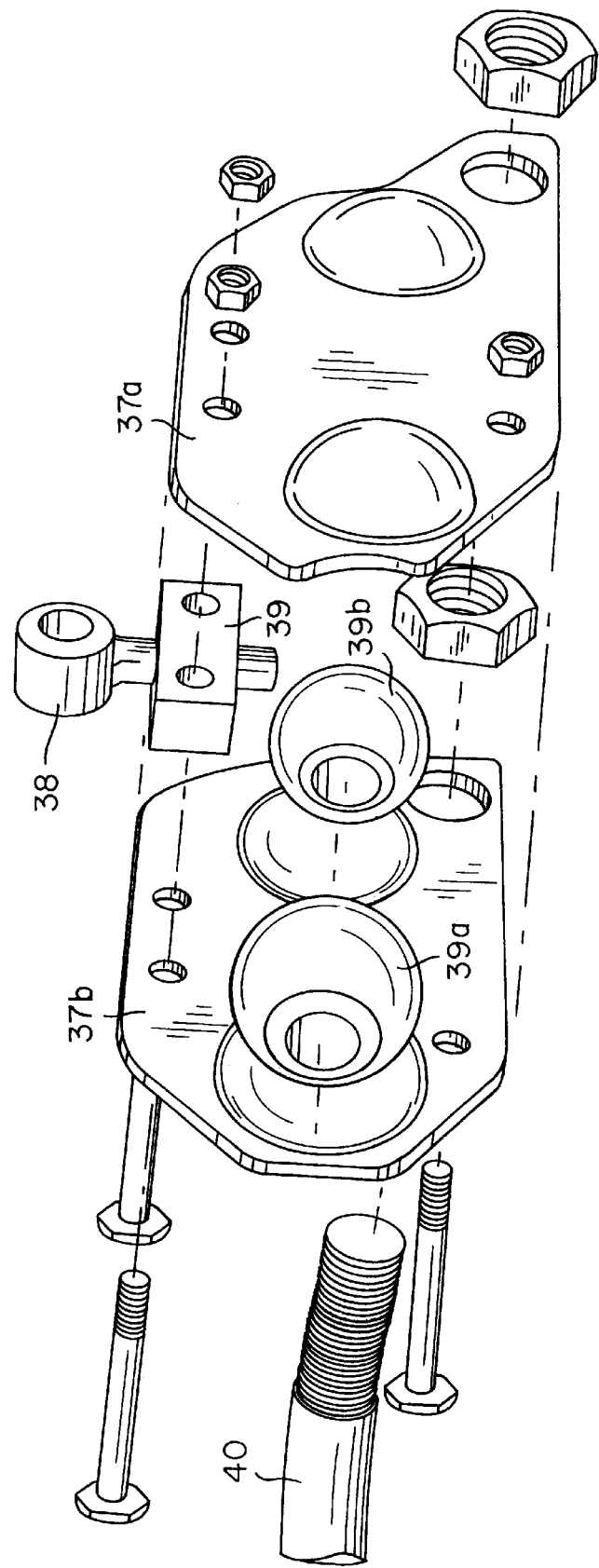
FIG. 5 is an exploded perspective view of a carriage forming part of the invention.

The carriage, whose components are illustrated in FIG. 5, has a body 36 formed from a pair of plates 37a,37b which sandwich a pair of sliding spherical bushings 39a,39b having bores that ride upon the outer rail 34. (These bushings might be replaced by wheels or rollers. The term "bearinqs" used in the claims below is meant to be generic to all such alternatives.) The distance between the centerlines of the bushings is the same as the rail spacing. Some free play may be provided to allow for minor variations in the rail spacing. A guide loop 38, fixed between the plates 37a,37b by a pair of bolts, rides along the inner rail 32.

An arm 40 made of round steel stock having a circumferentially ribbed surface (see FIG. 1) is fixed to the carriage by means of a pair of nuts threaded onto the end of the arm, one on either side of plate 37a. The arm points away from the wall of the stall. As the carriage curves and twists, the arm moves from a near-horizontal orientation within a plane transverse to the length of the stall at the top of the wall, to a near-vertical orientation at the bottom.

An extension rod 44 extends approximately perpendicular to the arm. Its distal end is connected to the milker claw by a short flexible tether 48. The position of the extension rod can be deliberately changed by moving its eye 46 along the arm, but the circumferential ribs keep the extension rod from sliding on the arm accidentally.

The carriage is hoisted upward on the rails by a long-stroke air cylinder 50 supported on the stall wall by one or more brackets. A rope or cable 54 connects the bottom of the piston rod 56 to the carriage. Ordinarily, the force of gravity is sufficient to lower the carriage, but one could alter the mechanism to provide a push-pull action if needed. A pair of spaced guide bars 58 affixed to the rod straddle the outer rail 34, to keep the rod from rotating.

The air cylinder is actuated at the end of the milking period, to remove the milkers from the teats. The end of the period may be set by a timer, but I prefer to monitor milk flow with a flow sensor (not shown), and to retract the milkers when the flow rate falls below a certain threshold.

While I have described a rail way comprising two round rods, I recognize that other constructions might work as well or better. For example, the rails do not have to be round. And a monorail system is conceivable (in which case, of course, the rail would have to have a non-circular, e.g., square, cross-section). In a monorail system, the rail would have to be twisted at its lower end to produce the desired yawing motion of the carriage. (Because of these alternative possibilities, we refer to a "rail way" in the claims that follow to connote a system of one or more rails.) In any event, the rail way prevents the carriage from having any free rotational movement, and causes the carriage to yaw near the bottom of its travel. Determining the exact best geometry for the rail way and carriage should be a matter of ordinary skill, requiring only routine experimentation to meet the general design requirements specified above.

So far, this description has referred only to "milkers" as the device supported by the retractor mechanism. I intend, however, to use this mechanism with other devices, particularly low-pressure teat sprayers which, like milkers, must be withdrawn properly to prevent their contamination. The claims below therefore refer to both type of devices.

Since the invention is subject to modifications and variations, it is intended that the foregoing description and the accompanying drawings shall be interpreted as only illustrative of the invention defined by the following claims.

I claim:

1. A retractor for withdrawing automatic milkers or teat sprayers from the udder of a cow in a milking parlor stall, said retractor comprising a rail way affixed to the stall, said rail way defining a path having a lower end nearer the udder and an upper end further from the udder, a carriage having bearings for engaging the rail way so that the carriage can move along the rail way, said rail way and said carriage being constructed so as to prevent any free rotational movement of the carriage, said carriage having an arm extending away from said path, and an element connecting the arm to the milkers or teat sprayers, said rail way being configured at its lower end to cause the carriage to twist about the path so that the arm swings from a substantially vertical orientation at the lower end of the path to a substantially horizontal orientation at the upper end of the path.

2. The invention of claim 1, further comprising an extension rod mounted upon the arm and extending perpendicularly there-from, and wherein the element connecting the arm to the milkers or teat sprayers is a flexible tether.

3. The invention of claim 2, further comprising an adjuster for changing the position of the extension rod along the arm.

4. The invention of claim 1, wherein the rail way comprises a pair of rails having a constant spacing, and the carriage has bearings engaging both said rails.

5. The invention of claim 4, wherein the rails are parallel to one another in a common vertical plane near the top of the path, and the rails are parallel to one another in a common horizontal plane near the bottom of the path.

6. The invention of claim 1, wherein the rail way comprises a monorail having a non-circular cross-section.

\* \* \* \* \*